United States Patent
Song

(10) Patent No.: US 8,171,512 B2
(45) Date of Patent: May 1, 2012

(54) HOST DEVICE HAVING NOTICE FUNCTION FOR SETTING ENVIRONMENT AND SETTING ENVIRONMENT METHOD THEREOF

(75) Inventor: Yong-chun Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 725 days.

(21) Appl. No.: 11/702,549

(22) Filed: Feb. 6, 2007

(65) Prior Publication Data

US 2008/0066101 A1 Mar. 13, 2008

(30) Foreign Application Priority Data

Sep. 7, 2006 (KR) .................. 10-2006-0086339

(51) Int. Cl.
- G06F 3/00 (2006.01)
- G06F 13/00 (2006.01)
- H04N 5/445 (2006.01)

(52) U.S. Cl. ........... 725/37; 725/139; 725/140; 715/719

(58) Field of Classification Search .................. 725/37, 725/139, 140; 715/700, 716, 719, 722, 810, 715/825

See application file for complete search history.

(56) References Cited

U.S. PATENT DOCUMENTS

| | | | | |
|---|---|---|---|---|
| 5,995,162 A | * | 11/1999 | Fujimori | 348/569 |
| 2002/0059631 A1 | | 5/2002 | Lee | |
| 2002/0120932 A1 | * | 8/2002 | Schwalb | 725/37 |
| 2006/0064700 A1 | | 3/2006 | Ludvig et al. | |
| 2006/0212923 A1 | * | 9/2006 | Soneira | 725/151 |
| 2007/0016877 A1 | * | 1/2007 | Shirakawa et al. | 715/810 |
| 2007/0162925 A1 | * | 7/2007 | Kim et al. | 725/30 |

FOREIGN PATENT DOCUMENTS

| | | |
|---|---|---|
| EP | 1 507 363 A2 | 2/2005 |
| EP | 1 659 786 A2 | 5/2006 |
| WO | 96/41472 A1 | 12/1996 |
| WO | 00/79787 A1 | 12/2000 |
| WO | 02/100092 A1 | 12/2002 |
| WO | 2005/062606 A1 | 7/2005 |

OTHER PUBLICATIONS

Extended European Search Report issued Jun. 27, 2011 in counterpart European Patent Application No. 07107797.8.

* cited by examiner

Primary Examiner — Kristine Kincaid
Assistant Examiner — John Schnurr
(74) Attorney, Agent, or Firm — Sughrue Mion, PLLC

(57) ABSTRACT

A host device having a notice function for setting environment and a setting environment method thereof are disclosed. The host device includes a download unit which downloads and stores an application provided from a broadcasting station, a control unit which executes the application stored in the download unit and thus to change a setting environment, and a display unit which displays the setting environment changed by the control unit on a screen.

10 Claims, 6 Drawing Sheets

HOST DEVICE HAVING NOTICE FUNCTION FOR SETTING ENVIRONMENT AND SETTING ENVIRONMENT METHOD THEREOF

CROSS-REFERENCE TO RELATED APPLICATIONS

This application claims priority from 35 U.S.C. §119(a) of Korean Patent Application No. 10-2006-0086339, filed Sep. 7, 2006, in the Korean Intellectual Property Office, the entire disclosure of which is incorporated herein by reference.

FIELD OF THE INVENTION

Devices and methods consistent with the present invention relate generally to a host device having a notice function for setting environment and a setting environment method thereof, more particularly, to a host device having a notice function for setting environment, which displays a setting environment changed by an application provided from a broadcasting station on a screen, and a setting environment method thereof.

BACKGROUND OF THE INVENTION

In the past, a broadcasting has been a one directional one-to-plural service, which unilaterally provides simple contents, such as images and sounds, to unspecified individuals. However, in the future, with a digitization in broadcasting and advances in communication techniques, the broadcasting will make progress in a direction that a bi-directional interactive service is activated and thus various additional high-quality services are pursued. Such various additional services are developing by many application developers, and a role of a host device, such as a set-top box and a television set, for using the various additional services is needed.

FIG. 1 is a view schematically exemplifying a related art digital broadcasting system.

Referring to FIG. 1, the related art digital broadcasting system includes an application server 10, a broadcasting network 20, and host devices 30 and 40.

The application server 10 stores applications for effectively providing a variety of services, such as images, sounds and additional services, to user when a broadcasting station (not illustrated) provides such a variety of services. The applications stored in the application server 10 are delivered to the host devices 30 and 40 through the broadcasting network 20, and are executed by the host devices 30 and 40.

Each of the host devices 30 and 40 stores an application required in carrying out an operation of the host devices 30 and 40 in a fabrication thereof. This application is called a native application. The host devices 30 and 40 not only execute the native applications, but also execute the various downloaded applications provided from the broadcasting station.

FIG. 2 is a diagram exemplifying a software module structure of each of the host devices, which receives a digital broadcasting.

Referring to FIG. 2, a first application, a second application, and a third application, which are applications provided from the broadcasting station, are stored in the application server 10. The first, the second and the third applications belong to one of an Advanced Common Application Platform (ACAP). an Open Cable Application Platform (OCAP) layer and a Multimedia Home Platform (MHP) layer. As examples of such applications, there are an Electronic Program Guide (EPG) application, a monitor application, etc.

An execution engine layer is a layer, which provides an environment capable of executing the native application and the applications stored in the application server 10.

A native middleware layer provides an application program interface (API) for executing the native application and the applications provided from the broadcasting station, and adjusts hardware through a hardware abstraction layer (HAL).

The HAL provides an API, so that the native middleware can control the hardware. The hardware layer is physical hardware components of the host device 30 or 40.

The host device 30 or 40 based on the software module structure constructed as described above often simultaneously executes the applications downloaded and provided from the broadcasting station with the native application. In this case, with the execution of the native application, the applications provided from the broadcasting station can change set items. At this time, if the changed items do not exist in a menu, a user can see that the host device 30 or 40 malfunctions, and thus make muddle of using the host device 30 or 40.

SUMMARY OF THE INVENTION

Exemplary embodiments of the present invention are to solve at least the above problems and/or disadvantages and to provide at least the aspects described below. Accordingly, there are provided a host device having a notice function for setting environment, which displays a setting environment changed by an application provided from a broadcasting station on a screen to give notice of the setting environment of the host device to a user, thereby giving a facility for the user in using the host device, and a setting environment method thereof.

Additional aspects of the invention will be set forth in part in the description which follows and, in part, will be obvious from the description, or may be learned by practice of the invention.

According to an aspect of an exemplary embodiment of the present invention, there is provided a host device including a download unit which downloads and stores an application provided from a broadcasting station, a control unit which executes the application stored in the download unit and thus to change a setting environment, and a display unit which displays the setting environment changed by the control unit on a screen.

The host device may further include a user interface (UI) producing unit which produces a UI for displaying menu items corresponding to the changed setting environment on the screen.

Here, if the menu items corresponding to the changed setting environment are not included in existing menu items, the UI producing unit may produce a UI in which the menu items corresponding to the changed setting environment are added to the existing menu items.

Also, the host device may further include an application storing unit which stores a native application setting up the setting environment of the host device, in a fabrication of the host device. In this case, if the changed setting environment is determined as menu items capable of being set by the native application, the control unit may control the display unit to display menu items on the screen.

The download unit may unload the application when a channel corresponding to broadcasting signals in which the application is included is changed.

According to another aspect of an exemplary embodiment of the present invention, there is provided a setting environment method including downloading and storing an application provided from a broadcasting station, executing the application to change a setting environment, and displaying the changed setting environment on a screen.

The setting environment method may further include producing a UI for displaying menu items corresponding to the changed setting environment on the screen.

If the menu items corresponding to the changed setting environment are not included in the existing menu items, the producing the UI may include producing a UI in which the menu items corresponding to the changed setting environment are added to existing menu items.

The setting environment method may further include storing a native application setting up the setting environment of the host device, in a fabrication of the host device, and producing a UI for displaying menu items on the screen when the changed setting environment is determined as the menu items capable of being set by the native application.

Also, the setting environment method may further include unloading the application when a channel corresponding to broadcasting signals in which the application is included is changed.

BRIEF DESCRIPTION OF THE DRAWING FIGURES

The above aspect and other features of the present invention will become more apparent by describing in detail exemplary embodiments thereof with reference to the attached drawing figures, wherein.

Throughout the drawings, the same drawing reference numerals will be understood to refer to the same elements, features, and structures.

DETAILED DESCRIPTION OF THE EXEMPLARY EMBODIMENTS OF THE INVENTION

The matters defined in the description such as a detailed construction and elements are provided to assist in an understanding of the embodiments of the invention and are merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Figure 1:
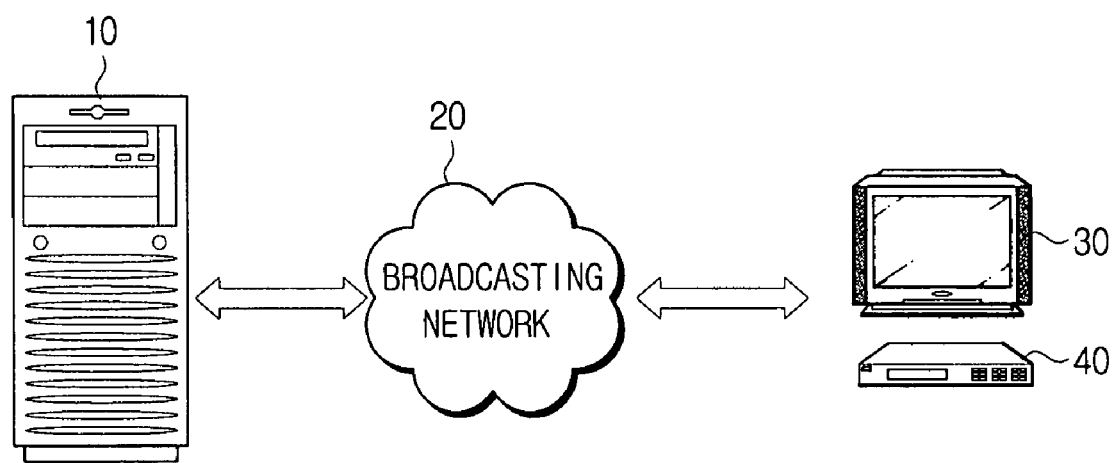
FIG. 1 is a view schematically exemplifying a related art digital broadcasting system.
Figure 2:
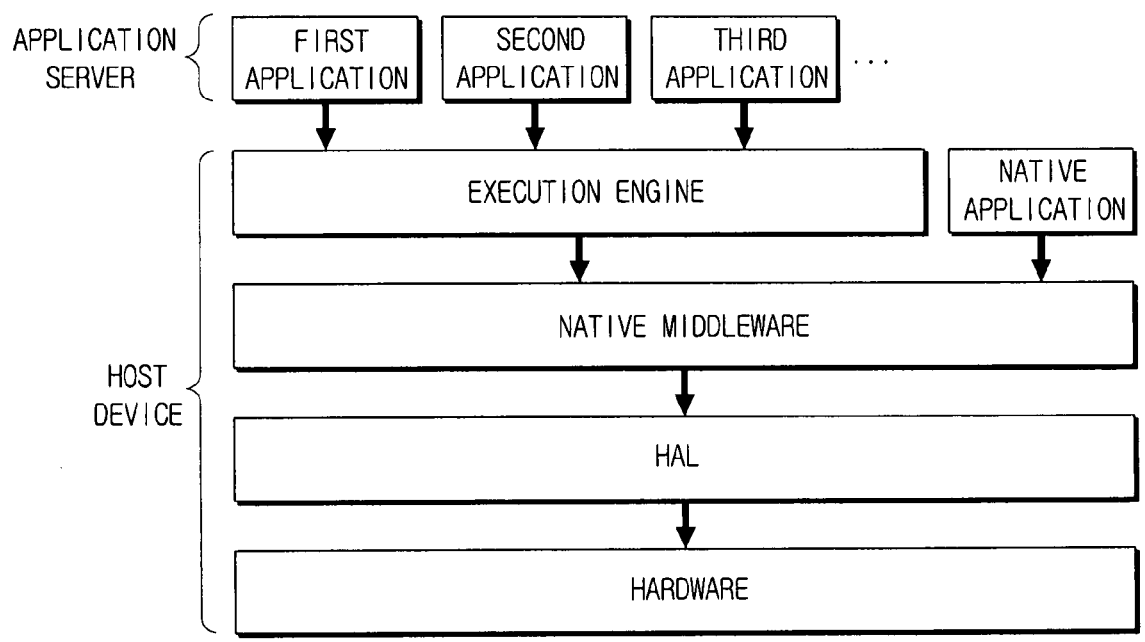
FIG. 2 is a diagram exemplifying a software module structure of a host device, which receives a digital broadcasting.
Figure 3:
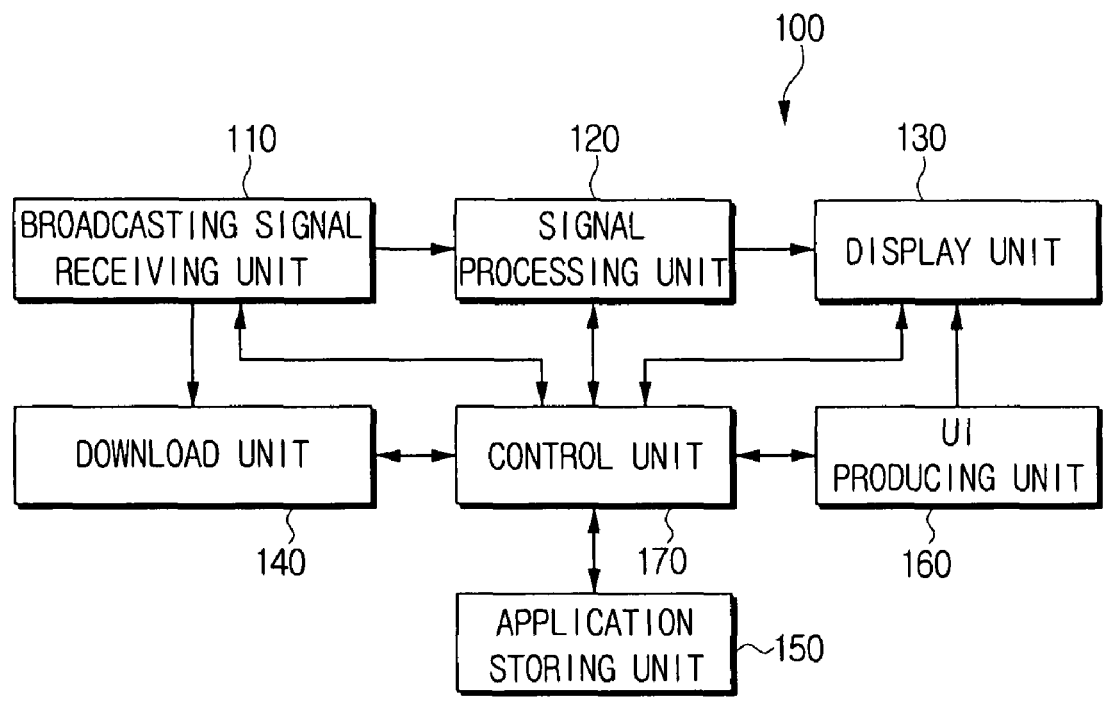
FIG. 3 is a block diagram exemplifying a schematic construction of a host device in accordance with an exemplary embodiment of the present invention.

FIG. 3 is a block diagram exemplifying a schematic construction of a host device in accordance with an exemplary embodiment of the present invention.

Referring to FIG. 3, the host device 100 of the exemplary embodiment of the present invention includes a broadcasting signal receiving unit 110, a signal processing unit 120, a display unit 130, a download unit 140, an application storing unit 150, a UI producing unit 160, and a control unit 170.

The broadcasting signal receiving unit 110 receives broadcasting signals, which correspond to a channel selected according to a user command input through a remote controller (not illustrated) or a key pad (not illustrated). The broadcasting signal receiving unit 110 parses the received broadcasting signals into image data, acoustic data and additional data.

The signal processing unit 120 outputs the decoded image data, the acoustic data and the additional data parsed by the broadcasting signal receiving unit 110. The decoded image data is displayed on the display unit 130 together with the decoded additional data, and the decoded acoustic data is output through a speaker (not illustrated).

The download unit 140 downloads and stores applications belonging to an OCAP application layer or an MHP application layer provided from a broadcasting station among the additional data parsed by the broadcasting signal receiving unit 110.

The application storing unit 150 stores a native application required in setting up a setting environment of the host device 100. Such a native application is stored in the application storing unit 150 in a fabrication of the host device 100.

When an electric power is supplied to the host device 100, the control unit 170 executes the native application stored in the application storing unit 150 to set a setting environment of the host device 100 in a condition before the electric power is shut off last. And when the applications provided from the broadcasting station are downloaded, the control unit 170 executes the downloaded applications and changes the setting environment set in advance. That is, the setting environment of the host device 100 is changed by the applications provided from the broadcasting station, so that optimal images or sounds are provided to a user.

The UI producing unit 160 produces a UI for displaying the setting environment changed by the control unit 170 on the display unit 130. That is, if the changed setting environment is menu items capable of being set at the native application, the UI producing unit 160 produces a UI to which the menu items corresponding to the changed setting environment are added. At this time, if the menu items corresponding to the changed setting environment are included in existing menu items, the UI producing unit 160 produces a UI in which the menu items corresponding to the changed setting environment are highlighted.

Hereinafter, an operation of the host device 100 constructed as described above will be explained with reference to 'picture size' menus illustrated in FIGS. 4A through 4C.

Figure 4A:
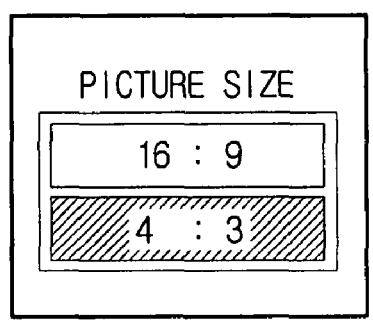
FIGS. 4A through 4C are views exemplifying a setting environment method of the host device in accordance with the exemplary embodiment of the present invention.
Figure 4B:
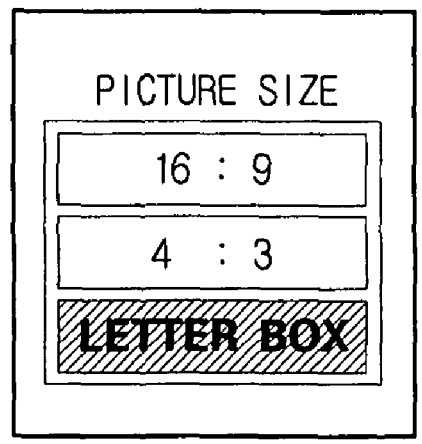
Figure 4C:
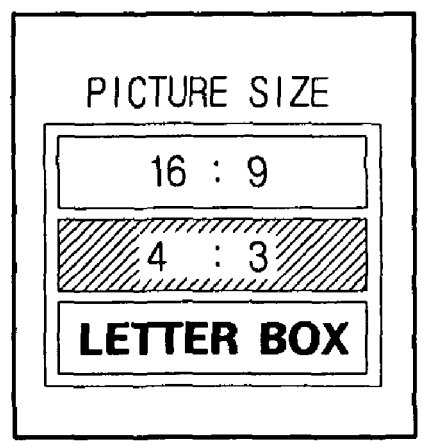

FIGS. 4A through 4C are views exemplifying a setting environment method of the host device in accordance with the exemplary embodiment of the present invention.

In FIG. 4A is illustrated a 'picture size' menu, which is a UI executed by the native application. That is, a '16:9' item and a '4:3' item exist in an existing 'picture size' menu, and thus a user can select one of the two items, thereby changing a setting condition of the host device 100. In this case, the currently selected '4:3' item is highlighted as illustrated in FIG. 4A, or displayed in a different color.

In FIG. 4B is illustrated a UI in which menu items corresponding to a setting environment changed by the applications provided from the broadcasting station are included. That is, the broadcasting station transmits, for example, an application for picture size along with image data, so that images provided from the broadcasting station are displayed in an optimal state on a screen.

The host device 100 downloads and executes the application described above, and thus the images displayed on the host device 100 are changed from a '4:3' size to a 'letter box' size. Also, the host device 100 displays a new 'letter box' item for giving notice of the setting environment changed as illustrated in FIG. 4B on the screen. At this time, the added new 'letter box' item is highlighted or displayed in a different color.

The user can change again the menu item changed as illustrated in FIG. 4B into a menu item illustrated in FIG. 4C at her or his discretion. That is, if the user does not want to watch current images in the 'letter box' size, she or he can manipulate the remote controller or the key pad to change the images into the '16:9' size or the '4:3' size, and watch the images. In this case, as illustrated in FIG. 4C, the 'letter box' item is displayed in a form different from that of the '16:9' item or the '4:3' item, which is the existing menu item, so that the user can see that it is the only item for current picture output.

Figure 5:
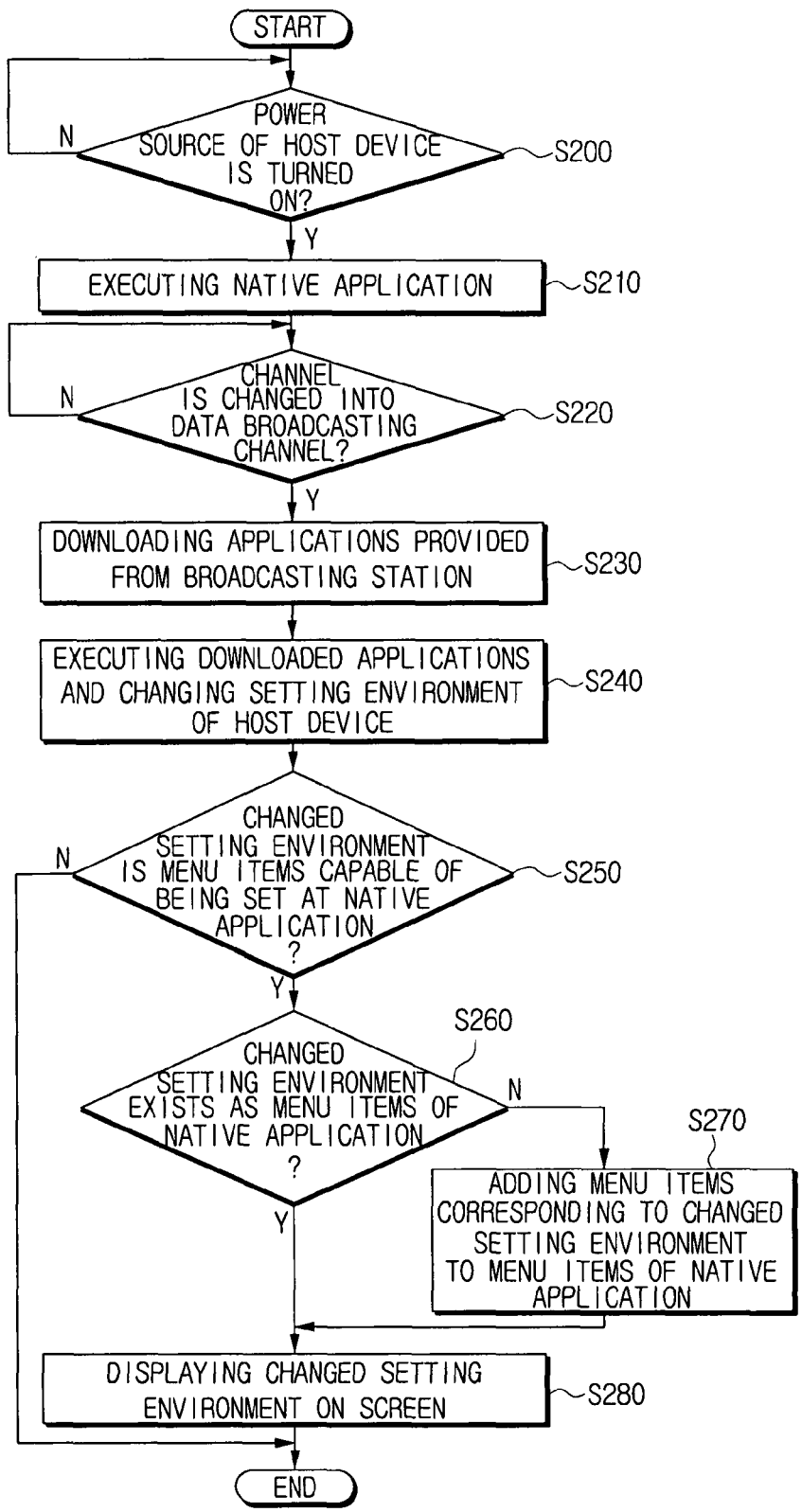
FIG. 5 is a flowchart exemplifying an operation of the host device in accordance with the exemplary embodiment of the present invention.

FIG. 5 is a flowchart exemplifying an operation of the host device in accordance with the exemplary embodiment of the present invention.

Referring to FIG. 5, first, when an electric power source of the host device 100 is turned on (S200), a native application is executed (S210). That is, the control unit 170 executes the native application stored in the application storing unit 150, and thus a setting environment of the host device 100 is set up by the native application.

At this time, if a channel is changed into a data broadcasting channel (S220), the applications provided from the broadcasting station are downloaded (S230). In other words, if the channel is changed into the data broadcasting channel, which provides image data, acoustic data and additional data, the download unit 140 downloads and stores applications received through the broadcasting receiving unit 110.

The control unit 170 executes the downloaded application and changes a setting environment of the host device (S240). That is, the control unit 170 executes the applications provided from the broadcasting station, so that the setting environment set up by the native application is changed, thereby allowing services provided from the broadcasting station to be provided in an optimal environment to a user.

Here, if the control unit 170 determines that the changed setting environment is menu items capable of being set at the native application (S250), it determines whether the changed setting environment exists as the menu items of the native application (S260), and controls to display the changed setting environment on the screen (S280).

According to the kind of the native application stored in the host device 100, there are menu items that are fabricated not to allow the user to directly set, and these menu items are not provided to the user as a UI. As examples of such menu items, there are menu items used for repairing or upgrading the host device 100.

In case that the changed setting environment is the menu items capable of being set at the native application, the control unit 170 determines whether menu items corresponding to the changed setting environment exists as existing menu items on the basis of the kind of the native application as described above. If the menu items corresponding to the changed setting environment exists as the existing menu items, the UI producing unit 160 produces a UI in which the menu items corresponding to the changed setting environment are highlighted. To the contrary, if the menu items corresponding to the changed setting environment do not exist as the existing menu items, the UI producing unit 160 produces a UI to which the menu items corresponding to the changed setting environment are added (S270).

With the process described above, the host device can display the setting environment changed by the applications provided from the broadcasting station on the screen.

Figure 6:
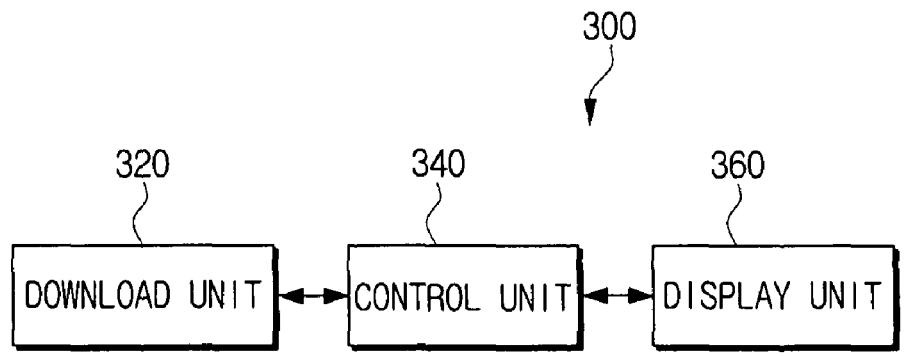
FIG. 6 is a block diagram exemplifying a schematic construction of a host device in accordance with another exemplary embodiment of the present invention.

FIG. 6 is a block diagram exemplifying a schematic construction of a host device in accordance with another exemplary embodiment of the present invention.

Referring to FIG. 6, the host device 300 in accordance with another exemplary embodiment of the present invention includes a download unit 320, a control unit 340, and a display unit 360.

The download unit 320 stores downloading applications provided from a broadcasting station (not illustrated). Here, the downloaded applications belong to an OCAP application layer and an MHP application layer.

The control unit 340 executes the application stored in the download unit 320 and changes a setting environment. That is, the control unit 340 changes the setting environment of the host device 300 set by a native application according to the applications provided from the broadcasting station, so that optimal images or sounds are provided to a user.

The display unit 360 displays the setting environment changed by the control unit 340 on a screen. In other words, if the setting environment changed by the control unit 340 is menu items capable of being set at the native application, a UI to which menu items corresponding to the changed setting environment are added is displayed on the screen. At this time, if the menu items corresponding to the changed setting environment exist in existing menu items, a UI in which the menu items corresponding to the changed setting environment are highlighted is displayed on the screen.

Figure 7:
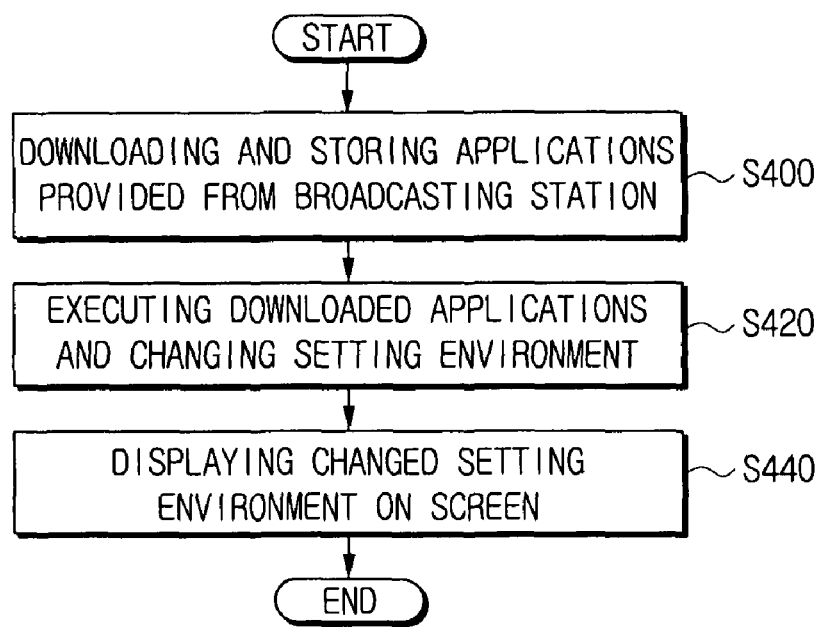
FIG. 7 is a flowchart exemplifying an operation of the host device in accordance with another exemplary embodiment of the present invention.

FIG. 7 is a flowchart exemplifying an operation of the host device in accordance with another exemplary embodiment of the present invention.

Referring to FIG. 7, applications provided from the broadcasting station are downloaded and stored (S400). That is, applications, which belong to an OCAP application layer and an MHP application layer, are downloaded from the broadcasting station and are stored in the download unit 320.

Subsequently, the control unit 340 executes the downloaded applications and changes a setting environment (S420). That is, the control unit 340 executes the applications to change the setting environment of the host device 300, so that optimal images or sounds are provided to a user.

Next, the display unit 360 displays the changed setting environment in the screen (S440). As a result, the user notices the changed setting environment of the host device 300.

As apparent from the foregoing description, according to the exemplary embodiments of the present invention, the host device having the notice function for setting environment and the setting environment method thereof display the setting environment changed by the applications provided from the broadcasting station on the screen to give notice of the setting environment of the host device to the user, thereby preventing changes caused by the execution of the applications from being seen as a malfunction of the host device. Also, the host device having the notice function for setting environment and the setting environment method thereof according to the exemplary embodiments of the present invention change the menu items according to user's convenience, thereby giving a facility for the user in using the host device.

Although exemplary embodiments of the present invention have been shown and described in order to exemplify the principle of the present invention, the present invention is not limited to the specific exemplary embodiment. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A host device, comprising:
    an application storing unit which stores a native application setting up a setting environment of the host device;
    a download unit which downloads an application provided from a broadcasting station;
    a control unit which executes the downloaded application to change the setting environment; and
    a display unit which displays menu items corresponding to the changed setting environment on a screen,
    wherein the control unit determines whether the menu items corresponding to the changed setting environment exist as existing menu items of the native application, and the control unit controls the display unit to display the existing menu items of the native application on the screen if the control unit determines that the menu items corresponding to the changed setting environment exist as the existing menu items of the native application, and the control unit controls the display unit to display a new menu item of the downloaded application and the existing menu items of the native application if the control unit determines that the menu items corresponding to the changed setting environment do not exist as the existing menu items of the native application, and
    wherein the display unit displays the new menu item of the downloaded application in a form different from the existing menu items of the native application on the screen to notify the changed setting environment.

2. The device of claim 1, further comprising:
    a user interface (UI) producing unit which produces a UI for displaying the menu items corresponding to the changed setting environment on the screen.

3. The device of claim 2, wherein the setting environment is related to a screen size.

4. The device of claim 1, wherein the download unit unloads the downloaded application when a channel corresponding to broadcasting signals in which the downloaded application is included is changed.

5. The device of claim 1, wherein the downloaded application belongs to an Open Cable Application Platform (OCAP) layer or a Multimedia Home Platform (MHP) layer.

6. A setting environment method, comprising:
    storing a native application setting up a setting environment of the host device;
    downloading and storing an application provided from a broadcasting station;
    executing the downloaded application to change the setting environment; and
    displaying menu items corresponding to the changed setting environment on a screen,
    wherein the displaying comprises determining whether the menu items corresponding to the changed setting environment exist as existing menu items of the native application, and displaying the existing menu items of the native application on the screen if it is determined that the menu items corresponding to the changed setting environment exist as the existing menu items of the native application, and displaying a new menu item of the downloaded application and the existing menu items of the native application if it is determined that the menu items corresponding to the changed setting environment do not exist as the existing menu items of the native application, and
    wherein the displaying comprises displaying the new menu item of the downloaded application in a form different from the existing menu items of the native application on the screen to notify the changed setting environment.

7. The method of claim 6, further comprising:
    producing a user interface (UI) for displaying the menu items corresponding to the changed setting environment on the screen.

8. The method of claim 7, wherein the setting environment is related to a screen size.

9. The method of claim 6, further comprising:
    unloading the downloaded application when a channel corresponding to broadcasting signals in which the downloaded application is included is changed.

10. The method of claim 6, wherein the downloaded application belongs to an Open Cable Application Platform (OCAP) layer or a Multimedia Home Platform (MHP) layer.

* * * * *